(12) United States Patent
Ma

(10) Patent No.: US 8,208,351 B2
(45) Date of Patent: Jun. 26, 2012

(54) OPTICAL STORAGE MEDIUM PLAYBACK APPARATUSES AND RELATED METHOD THEREOF

(75) Inventor: Tak-Man Ma, NT (HK)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 500 days.

(21) Appl. No.: 12/486,763

(22) Filed: Jun. 18, 2009

(65) Prior Publication Data

US 2010/0322045 A1    Dec. 23, 2010

(51) Int. Cl.
*G11B 7/085* (2006.01)
(52) U.S. Cl. .................................................. 369/30.23
(58) Field of Classification Search ............... 369/30.23, 369/47.32, 30.18, 30.03; 725/39–51
See application file for complete search history.

(56) References Cited

U.S. PATENT DOCUMENTS 8,024,754 B2 *  9/2011  Nagamatsu .................... 725/39

FOREIGN PATENT DOCUMENTS

CN          1973331 A       5/2007

* cited by examiner

*Primary Examiner* — Ali Neyzari
(74) *Attorney, Agent, or Firm* — Winston Hsu; Scott Margo (57) ABSTRACT

An optical storage medium playback apparatus includes an optical storage access device, a connection port, and a controller. The optical storage access device is implemented for reading a multimedia content from an optical storage medium. The controller is coupled to the optical storage access device and the connection port, and is implemented for storing a portion of the multimedia content read from the optical storage medium into an external storage via the connection port when the external storage is electrically connected to the connection port, and for accessing the portion of the multimedia content which is stored in the external storage electrically connected to the connection port and performing a playback operation upon data read from the optical storage medium concurrently.

26 Claims, 7 Drawing Sheets

OPTICAL STORAGE MEDIUM PLAYBACK APPARATUSES AND RELATED METHOD THEREOF

BACKGROUND

The disclosed embodiments relate to playing multimedia contents stored on an optical storage medium, and more particularly, to optical storage medium playback apparatuses which use an external storage connected thereto for buffering data read from an optical storage medium or providing a playback schedule of data on the optical storage medium, and a related method thereof.

Some multimedia contents are contained within data files. In general, a container defines its content's file format. Specifically, a container format is a file format whose specification regards only the way data are stored within the file, whereas no specific coding scheme of the data is implied or specified. For example, MPEG-4 Part 14, formally ISO/IEC 14496-14, is a multimedia container format standard which is specified as a part of MPEG-4. It is most commonly used to store digital audio and digital video streams, especially those defined by MPEG, but can also be used to store other data such as subtitles and still images. As the official filename extension for MPEG-4 Part 14 files is .mp4, the container format is often referred to as MP4. As known to those skilled in the art, the MP4 file includes a first part including header information of the multimedia content, a second part including multimedia content's audio/video data, and a third part including tables which record file offsets (file positions) of the audio/video data for normal-mode playback or trick-mode playback (e.g., fast forward, fast reward, time search, etc.). Note that an audio/video stream from an MP4 file is divided into a number of data chunks. Moreover, those audio chunks and video chunks are interleaved evenly in the second part of the MP4 file for smooth playback. In MP4 format, only tables in the third part contain the file offsets of data chunks. Without these tables in the third part, it is impossible or difficult to identify the start/end file offset of a data chunk, where an end offset of one data chuck is a start offset of the next data chunk. Therefore, these tables are necessary for normal-mode/trick-mode playback of an MP4 file since fast forward/reward and time-search operations need to seek the start file offsets of some corresponding data chunks. Preferably, all of the tables should be loaded from the MP4 file into a memory before the actual playback starts. However, regarding a conventional optical disc player generally having limited resource due to cost considerations, such an implementation is not feasible as the optical disc player does not have enough memory to buffer all of the tables included in the MP4 file. Instead, the conventional optical disc player loads the requested tables on demand. That is, the conventional optical disc player first moves an optical pick-up head to seek tables of the MP4 file recorded on an optical disc, and then loads a portion of the tables included in the MP4 file into a small-sized internal memory, say, a dynamic random access memory (DRAM) with a maximum capacity of 2 megabytes for acting as a frame buffer, a video-audio streaming buffer, etc. This is because it is very common that the total size of tables from the third part of an MP4 file is larger than 2M bytes. Next, the conventional optical disc player moves the optical pick-up head to access requested audio/video data chunks for playback according to tables loaded into the internal memory. As only a portion of all tables included in the MP4 file is loaded and the access of the audio/video data chunks relies on the file offsets (file positions) pointed out by information stored in the tables, the amount of audio/video data chunks allowed to be played is therefore limited. When the file offsets (file positions) of following audio/video data chunks to be played are not available from the currently loaded tables in the internal memory, the conventional optical disc player has to move the optical pick-up head to seek needed tables of the MP4 file recorded on the optical disc, and then loads another portion of all tables included in the MP4 file into the internal memory. However, seeking data recorded on an optical disc is quite time-consuming. Besides, seeking from the second part of an MP4 file to the third part thereof and then moving the optical pick-up head back to the second part may consume at most 2 seconds for conventional optical disc players. In these 2 seconds, no audio/video data is parsed into the audio/video buffer, meaning that the audio/video buffer should be large enough for storing audio/video data required by playback for at least 2 seconds to thereby prevent any playback lag (buffer under-run). It is, however, difficult for a 2M-DRAM optical disc player to satisfy this requirement.

Regarding playback of files complying with other file formats, the conventional optical disc player still suffers from the small-sized internal memory. Taking the RealMedia (RM) format for example, the audio data included in an RM file are interleaved, which means that the audio data have an interleaved storage order different from an actual playback order thereof. Therefore, to smoothly play the multimedia content of the RM file, some of the interleaved audio data sequentially read from an optical disc should be stored in a buffer memory before they are played according to the actual playback order. However, in a case where the conventional optical disc player is not equipped with enough buffer memory space, the optical pick-up head must perform some unavoidable seeking operations, degrading user experience significantly due to audio/video lags.

With regard to the Audio Video Interleave (AVI) format, the tables stored in an AVI file are only used for trick-mode playback operation. However, as the conventional optical disc player does not have enough memory to buffer all of the tables included in the AVI file, the conventional optical disc player samples the tables included in the AVI file to select part of the tables to be loaded into the small-sized internal memory. As the internal memory merely stores a simplified version of tables, the conventional optical disc player fails to perform the trick-mode playback operations accurately. For instance, in each AVI file, there is a table which stores tuples (time, file-offset) for performing trick-mode operations. AVI file X may has tuples (0:30:00, 0x5000), (0:30:30, 0x6000), (0:31:00, 0x7000) in its table T. Since the size of the available memory is limited, the conventional optical disc player can only extract a sampled table S from table T to the memory. Table S may contain only (0:30:00, 0x5000), (0:31:00, 0x7000) after sampling. As a result, when a user performs a time-search action to time 0:30:30, the conventional optical disc player may only start displaying pictures from time 0:30:00 or 0:31:00. Such trick-mode operations are inaccurate.

In addition, an end user basically uses the remote control to control the conventional optical disc player. However, it is very inconvenient when the control is complicated. For example, the end user may want to show some pictures (still images) on a display device. The end user therefore has to arrange the display order and display timing for these pictures. In addition, the end user may also want to have background music played during the slideshow of the pictures. However, the conventional optical disc player does not have enough memory space available for recording all of the presentation timings for the image files and audio files. Besides, the end user may feel uncomfortable to do such playback scheduling by performing a lot of button-pressing actions on the remote control.

Therefore, it is desired to improve the user experience and the user-interface control convenience for a resource-limited optical disc player, such as a low-memory optical disc player.

SUMMARY

According to one aspect of the present invention, an optical storage medium playback apparatus is provided. The optical storage medium playback apparatus includes an optical storage access device, a connection port, and a controller. The optical storage access device is implemented for reading a multimedia content from an optical storage medium. The controller is coupled to the optical storage access device and the connection port, and implemented for storing a portion of the multimedia content read from the optical storage medium into an external storage via the connection port when the external storage is electrically connected to the connection port, and for accessing the portion of the multimedia content which is stored in the external storage electrically connected to the connection port and performing a playback operation upon data read from the optical storage medium concurrently.

According to another aspect of the present invention, an optical storage medium playback apparatus is provided. The optical storage medium playback apparatus includes an optical storage access device, a connection port, and a controller. The optical storage access device is implemented for reading a multimedia content from an optical storage medium. The controller is coupled to the optical storage access device and the connection port, and implemented for reading a playback schedule corresponding to the multimedia content on the optical storage medium from an external storage via the connection port when the external storage is electrically connected to the connection port, and performing a playback operation upon data read from the optical storage medium according to the playback schedule derived from the external storage.

According to yet another aspect of the present invention, an optical storage medium playback method employed in an optical storage medium playback apparatus is provided. The optical storage medium playback method includes the following steps: reading a multimedia content from an optical storage medium; storing a portion of the multimedia content read from the optical storage medium into an external storage via a connection port of the optical storage medium playback apparatus when the external storage is electrically connected to the connection port; and accessing the portion of the multimedia content which is stored in the external storage electrically connected to the connection port and performing a playback operation upon data read from the optical storage medium, concurrently.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

To put it simply, the conception of the disclosed embodiments is to use an external storage (e.g., a portable flash drive or hard drive) for improving the overall playback performance to prevent audio/video lags and the user-interface control convenience for an optical storage medium playback apparatus, such as an optical disc player. To more clearly illustrate technical features of the present invention, exemplary embodiments are given as follows.

Figure 1:
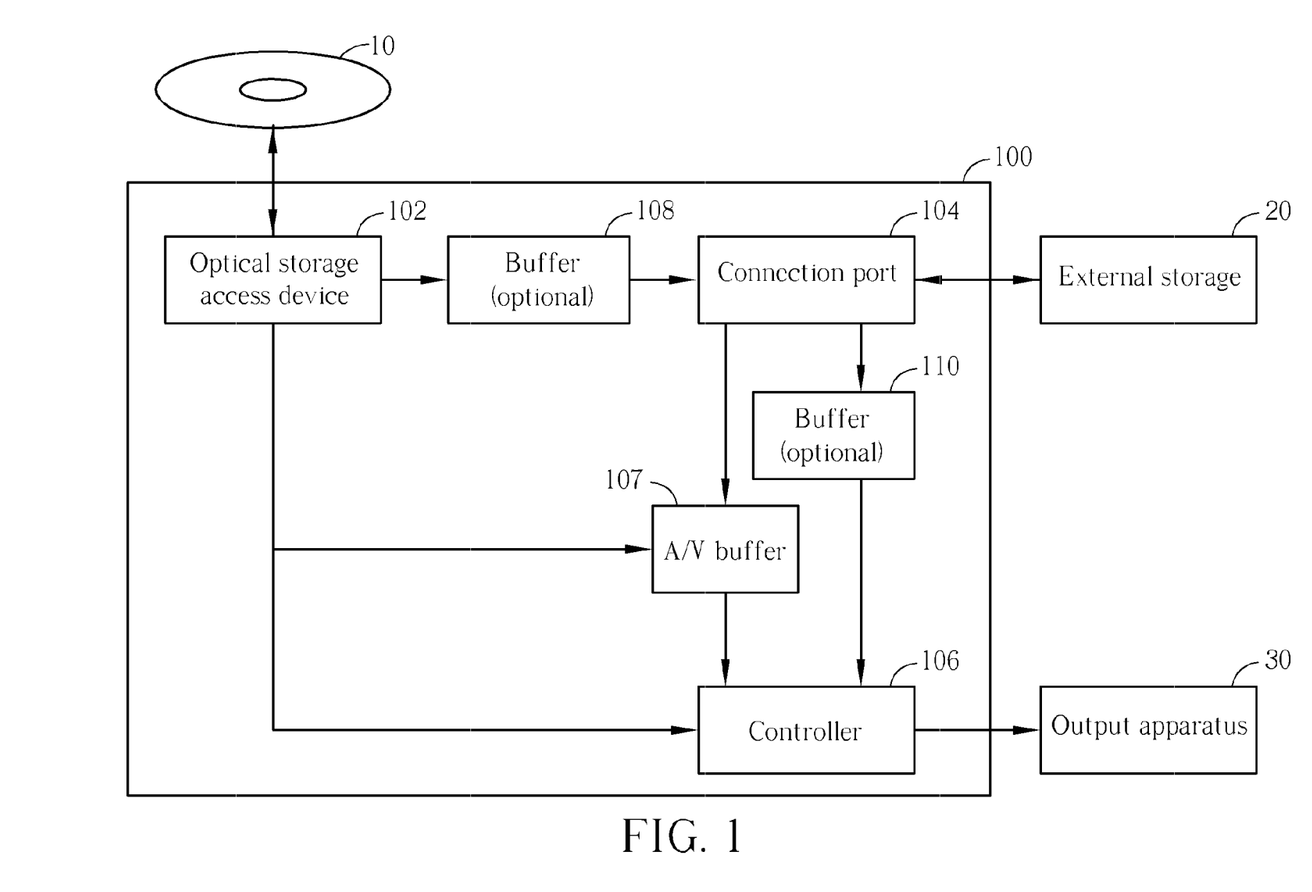
FIG. 1 is a block diagram illustrating an optical storage medium playback apparatus according to an exemplary embodiment of the present invention.

FIG. 1 is a block diagram illustrating an optical storage medium playback apparatus 100 according to an exemplary embodiment of the present invention. The optical storage medium playback apparatus 100 includes, but is not limited to, an optical storage access device 102, a connection port 104, a controller 106, an audio/video buffer (A/V buffer) 107, and a plurality of optional buffers 108 and 110. The optical storage access device 102 is implemented for reading multimedia contents from the optical storage medium 10. Specifically, the optical storage access device 102 includes elements required for reading data from the optical storage medium 10. For example, the optical storage medium playback apparatus 100 is an optical disc player used for accessing the optical storage medium 10 which is an optical disc, the optical storage access device 102 therefore includes elements such as a spindle motor, an optical pick-up head, a servo system, etc. The connection port 104 is an interface between the optical storage medium playback apparatus 100 and an external storage 20. For example, the connection port 104 is implemented using a universal serial bus (USB) port for connecting any external USB device (e.g., a USB flash drive or hard drive). The A/V buffer 107, such as a first-in first-out first-in-first-out (FIFO) buffer, is used to buffer data read by the optical storage access device 102 from the optical storage medium 10, such as audio/video data, before the audio/video data are processed (decoded) by the controller 106 for playback. The buffers 108 and 110 are used for buffering data to be recorded into the external storage 20 or data read from the external storage 20. It should be noted that the buffers 108 and 110 are optional components, and at least one of the buffers 108 and 110 can be omitted according to design requirements. That is, no matter whether the buffers 108 and 110 are employed, any optical storage medium playback apparatus 110 using an external storage (e.g., an external portable storage) to improve the playback performance and the user-interface control convenience obeys the spirit of the present invention.

The controller 106 includes elements related to controlling the overall playback operation of the optical storage medium playback apparatus 100. For example, the controller 106 may include a central processing unit (CPU) for processing (decoding) the multimedia data stored on the optical storage medium 10, a control unit for controlling the data transaction between the optical storage access device 102 and the external storage 20 electrically connected to the connection port 104, and a driving circuit for driving the output apparatus 30, such as a television, to present the multimedia contents stored on the optical storage medium 10 to the user.

The exemplary optical storage medium playback apparatus 100 supports a plurality of operational scenarios which will be detailed as follows.

Figure 2:
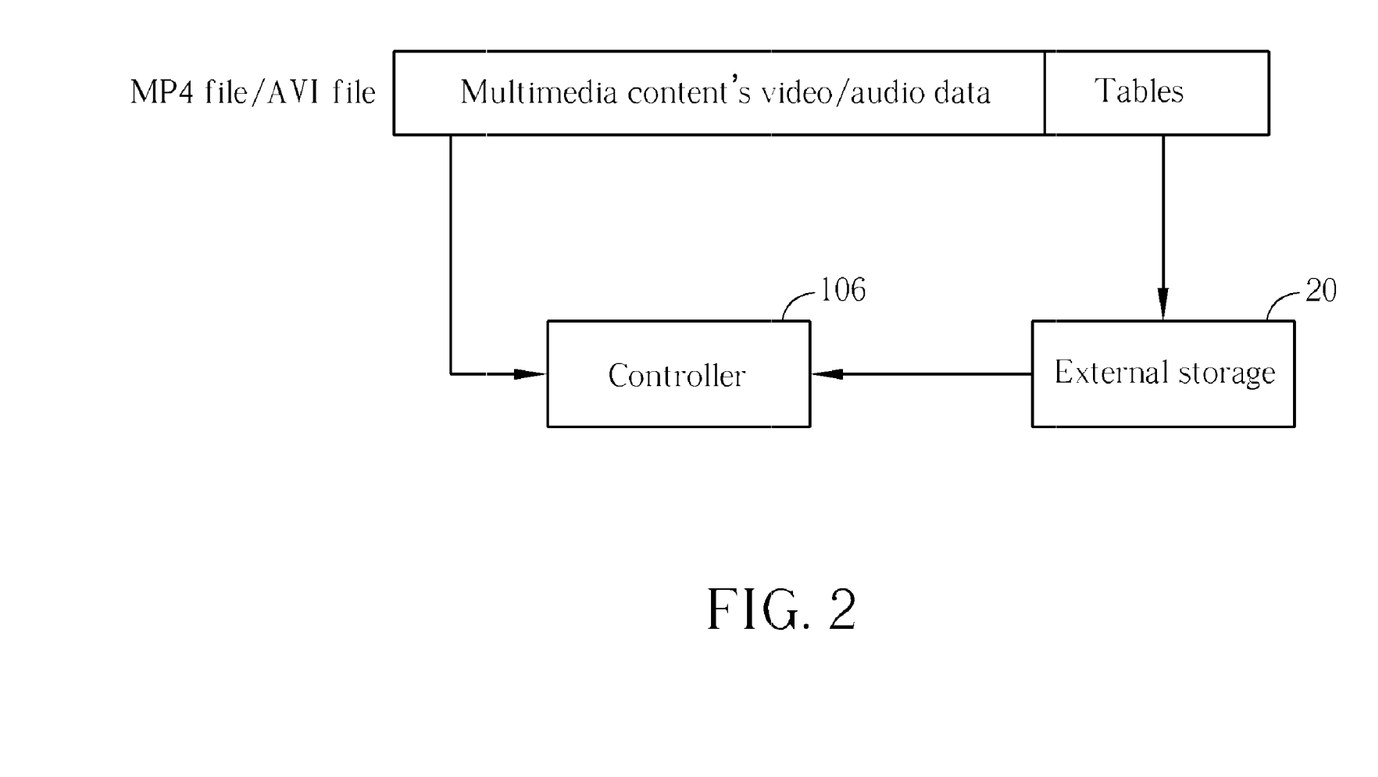
FIG. 2 is a schematic diagram illustrating a first operational scenario of the optical storage medium playback apparatus shown in FIG. 1.

Please refer to FIG. 2 in conjunction with FIG. 1. FIG. 2 is a schematic diagram illustrating a first operational scenario of the optical storage medium playback apparatus 100 shown in FIG. 1. In the first operational scenario, the optical storage access device 102 shown in FIG. 1 reads the multimedia content (e.g., an MP4 file or AVI file) from the optical storage medium 10, and the controller 106 stores a portion of the multimedia content into the external storage 20 when the external storage 20 is electrically connected to the connection port 100 and has enough free space available for data buffering. Specifically, the tables included in the MP4 file/AVI file are partially or completely loaded into the external storage 20 for improving the normal-mode/trick-mode playback performance of the optical storage medium playback apparatus 100. After the portion of the multimedia content (i.e., part or all of the tables) is loaded into the external storage 20, the controller 106 accesses the portion of the multimedia content when performing a playback operation upon video/audio data of the multimedia content stored on the optical storage medium 10. That is, as the external storage 20 stores tables required for playback of the video/audio data stored on the optical storage medium 10, the controller 106 can therefore access the portion of the multimedia content (i.e., part or all of the tables) buffered in the external storage 20 and performs the playback operation upon video/audio data of the multimedia content stored on the optical storage medium 10, concurrently; however, the conventional optical disc player is not able to do so due to lack of the external storage 20 employed for buffering the tables. Specifically, when the optical storage access device 102 of the optical storage medium playback apparatus 100 is reading video/audio data from the optical storage medium 10 to the A/V buffer 107, the controller 106 can read the preloaded portion of the multimedia content from the external storage 20 at the same time.

In general, the unused storage space of the external storage 20, such as an 8 GB USB flash drive or hard drive, is greater than the capacity of the small-sized internal memory (e.g., a 2 MB DRAM) of the optical storage medium playback apparatus 100. In other words, the data amount of tables loaded into the free space of the external storage 20 is much greater than the data amount of tables loaded into the internal memory (not shown) of the optical storage medium playback apparatus 100. In addition, the seeking time required for seeking data stored in the external storage 20 (e.g., a USB flash drive/hard drive) is much shorter than the seeking time required for seeking data stored on the optical storage medium 10. In short, the playback performance of the optical storage medium playback apparatus 100 can be improved greatly by avoiding undesired audio/video playback lags.

Figure 3:
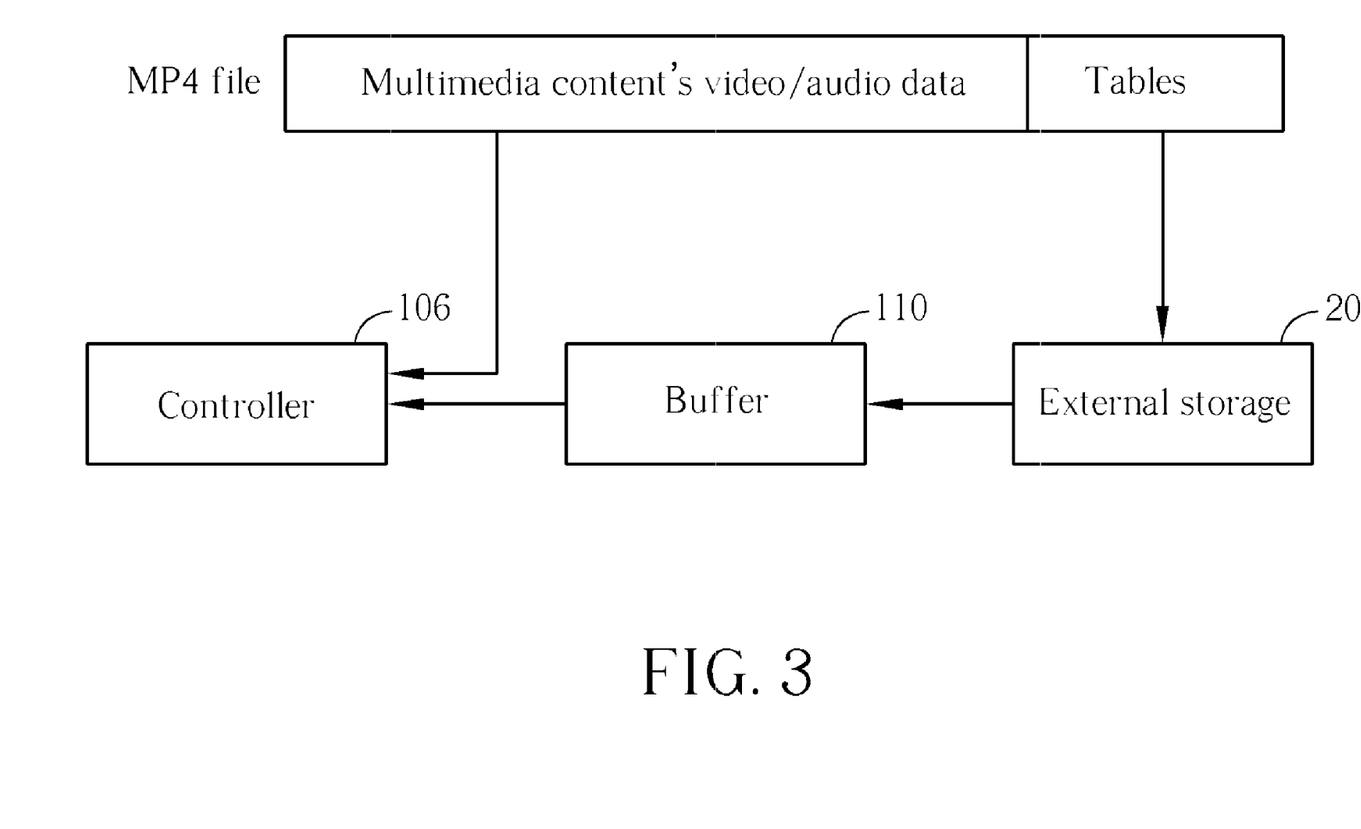
FIG. 3 is a schematic diagram illustrating a second operational scenario of the optical storage medium playback apparatus shown in FIG. 1.

Regarding the normal-mode playback operation of an MP4 file, one important observation shows that all tables' data are requested sequentially for playback. Based on such an observation, the present invention proposes a second operational scenario of the optical storage medium playback apparatus 100. As shown in FIG. 3, the buffer 110 is disposed between the controller 106 and the external storage 20 for buffering tables sequentially requested by the controller 106 from the external storage 20 when the controller 106 performs a playback operation upon the video/audio data of the multimedia content on the optical storage medium 10. In this exemplary implementation, the data access speed of the buffer 110 is faster than that of the external storage 20. For example, the buffer 110 is a first-in-first-out (FIFO) buffer implemented using a memory space allocated in the internal memory of the optical storage medium playback apparatus 100 or a dedicated memory other than the internal memory. In this way, the buffer 110 can be updated periodically and automatically by applying Direct Memory Access (DMA) operations due to the inherent characteristics of the FIFO buffer. Therefore, the update effort for controller 106 is very low since the buffer 110 has a faster response speed than the external storage 20. Besides, as described previously, when the optical storage access device 102 is reading video/audio data from the optical storage medium 10 to the A/V buffer 107, the controller 106 can read the preloaded portion of the multimedia content from the external storage 20 at the same time. Therefore, the video/audio playback lag can be effectively avoided.

Figure 4:
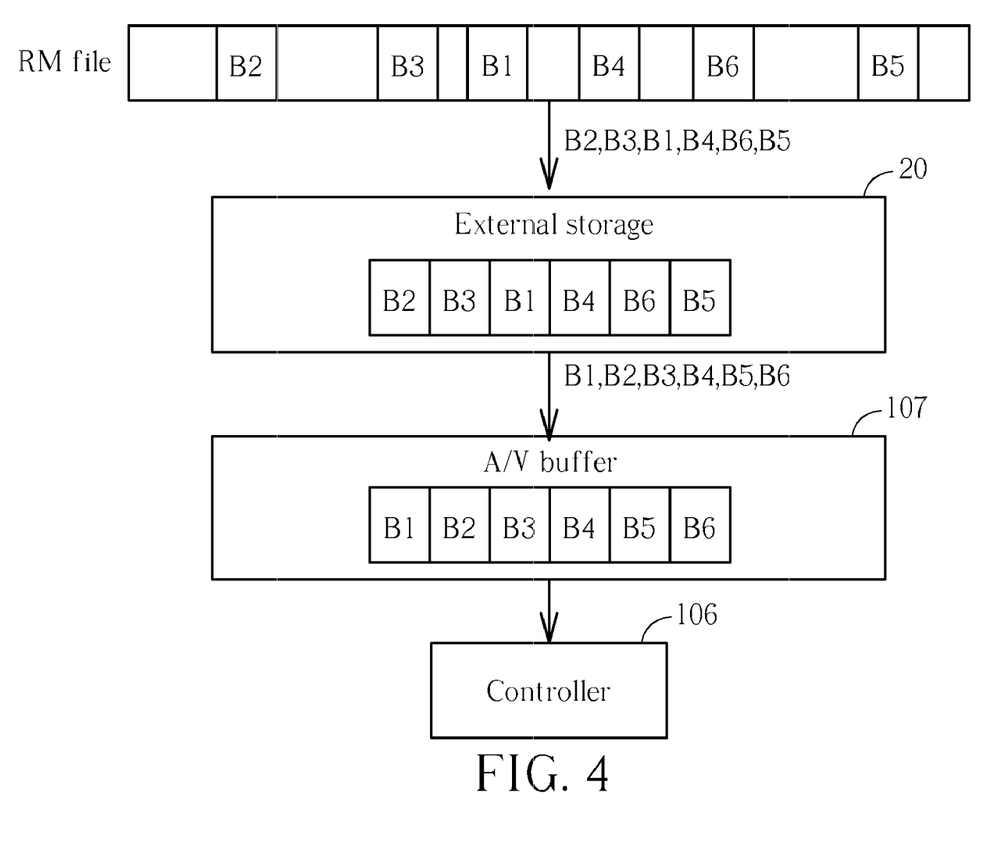
FIG. 4 is a schematic diagram illustrating a third operational scenario of the optical storage medium playback apparatus shown in FIG. 1.

Please refer to FIG. 4 in conjunction with FIG. 1. FIG. 4 is a schematic diagram illustrating a third operational scenario of the optical storage medium playback apparatus 100 shown in FIG. 1. In the third operational scenario, the optical storage access device 102 shown in FIG. 1 reads the multimedia content (e.g., an RM file) from the optical storage medium 10, and the controller 106 stores a portion of the multimedia content into the external storage 20 when the external storage 20 is electrically connected to the connection port 100 and has enough free space available for data buffering. Specifically, the portion of the multimedia content read from the optical storage medium 10 includes data blocks which are contained in the multimedia content on the optical storage medium 10 in an interleaved storage order different from an actual playback order. As shown in FIG. 4, the exemplary RM file includes two superblocks each having three data blocks according to the RM format, where one superblock includes data blocks B1, B2, and B3, and the other superblock includes data blocks B4, B5, and B6. In addition, the data blocks B1-B6 contain audio data, and are stored in the RM file in an interleaved order 'B2, B3, B1, B4, B6, B5' instead of an actual playback order 'B1, B2, B3, B4, B5, B6'. As mentioned above, the unused storage space of the external storage 20 (e.g., an 8 GB USB flash drive or hard drive) is generally greater than the small-sized internal memory (e.g., a 2 MB DRAM). Therefore, the interleaved data blocks B1-B6 of the RM file stored on the optical storage medium 10 can be sequentially loaded into the unused storage space of the external storage 20 according to the interleaved order 'B2, B3, B1, B4, B6, B5' before played by the controller 106 according to the actual playback order. Next, the controller 106 accesses the data blocks B1-B6 stored in the external storage 20 electrically connected to the connection port 104 according to the actual playback order to accomplish the playback operation upon the data of the RM file stored on the optical storage medium 10. The data blocks B1-B6 sequentially read from the external storage 20 according to the actual playback order are buffered in the A/V buffer 107, and then transferred to the controller 106 for playback. In this scenario, we can see, if an optical disc player does not have enough internal memory space for storing all audio data blocks B1, B2, B3 (also, their corresponding video data) into its audio buffer (video buffer), then no sequential reading is feasible. That is, the optical pick-up head thereof must perform unavoidable seek operations for reading audio blocks and corresponding video data blocks into the audio/video buffer 107. For the RM file, data blocks B1, B2, B3, for example, may contain audio data used for playback of more than 2 seconds, which means that an optical disc player's internal memory must be large enough for storing audio/video data needed for playback of more than 2 seconds to prevent any playback lag (buffer under-run). It is, however, difficult for an optical disc player having small-sized internal memory (e.g., a 2 MB DRAM) to satisfy this requirement. In conclusion, the playback performance of the optical storage medium playback apparatus 100 is improved greatly due to the external storage 20 which offers a storage space much greater than that of the small-sized internal memory for preventing frequent seek operations.

Figure 5:
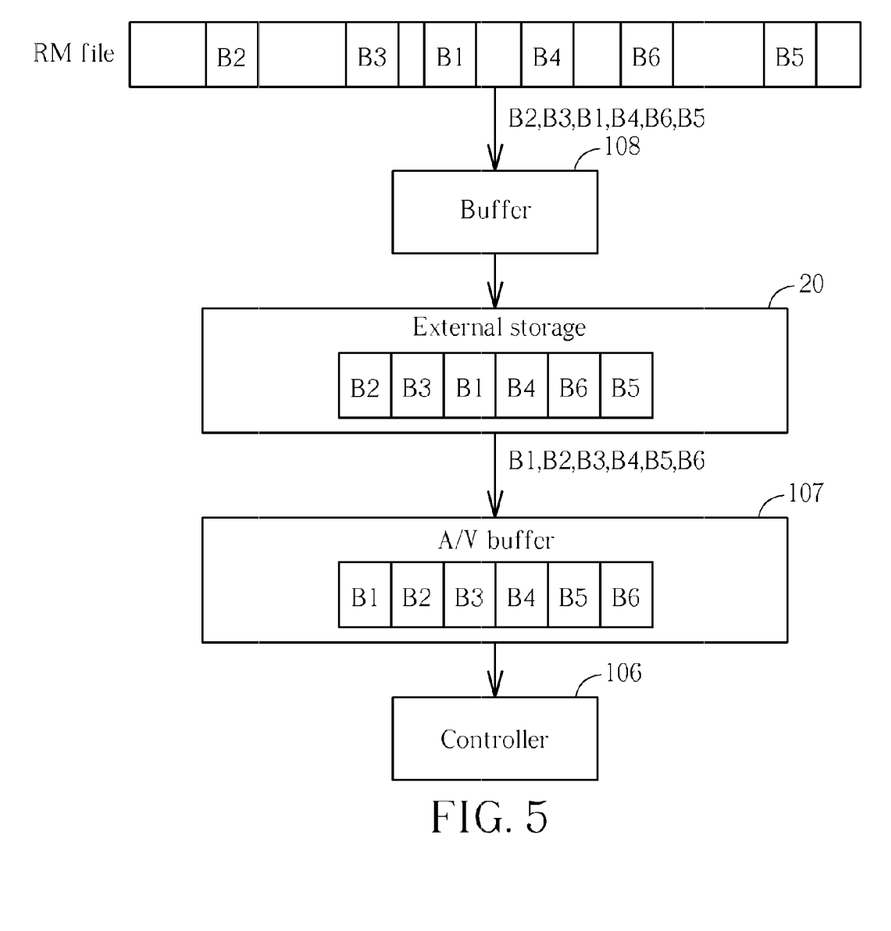
FIG. 5 is a schematic diagram illustrating a fourth operational scenario of the optical storage medium playback apparatus shown in FIG. 1.

Please refer to FIG. 5 in conjunction with FIG. 1 and FIG. 4. FIG. 5 is a schematic diagram illustrating a fourth operational scenario of the optical storage medium playback apparatus 100 shown in FIG. 1. Compared with the third operational scenario illustrated in FIG. 4, the fourth operational scenario has the buffers 108 implemented therein. Specifically, the buffer 108, coupled between the optical storage access device 102 and the connection port 104 via the controller 106 as shown in FIG. 1, is for buffering data of a portion of the multimedia content to be stored into the external storage 20 when the external storage 20 is electrically connected to the connection port 104, wherein the buffer 108 does not write stored data into the external storage 20 until a data amount of the stored data in the buffer 108 reaches a predetermined value associated with writing characteristics of the external storage 20. For example, provided that the external storage 20 is a flash drive, the writing time is much longer than the reading time for the same size of data. Besides, to optimize each writing operation performed upon the flash drive, the capacity of the buffer 108 is set equal to the size of one sector in the flash drive, and the buffer 108 writes stored data into the flash drive when it is full. In this way, as a bunch of data (i.e., all data stored in the full buffer 108) is stored per writing operation, the total number of times the writing operation is performed upon the external storage 20, such as a flash drive, is reduced. However, such a buffer design is for illustrative purposes only, and is not meant to be a limitation of the present invention.

Besides, while the optical pick-up head is reading audio and video data from a file on the optical storage medium 10 to the external portable storage 20 and the A/V buffer 107 respectively, the controller 106 can read audio data from the external portable storage 20 to the A/V buffer 107 concurrently. With the help of DMA operations, the effort of the controller 106 for doing that is quite low. Therefore, the controller 106 in the exemplary embodiments of the present invention can retain almost the same ability for decoding audio and video data as in the conventional optical disc player. Another important observation is that, although the above-mentioned exemplary design needs to perform many seek operations for moving audio data (in an interleaved order) from the external storage 20 to the A/V buffer 107 in an actual playback order, such seek operations are performed by the external storage 20, instead of the optical storage access device 102, in very high speed. So, the undesired video/audio playback lag can be effectively avoided.

It should be noted that the fourth operational scenario employing the buffer 108, as shown in FIG. 5, is merely one exemplary implementation of the present invention. Any modifications made to the fourth operational scenario without departing from the spirit of the present invention are feasible. For instance, in one alternative design, the buffer 108 can be removed from the exemplary scenario shown in FIG. 5. The same objective of using the external storage 20 to rearrange the order of data blocks is achieved. This also falls within the scope of the present invention.

In view of above, an optical storage medium playback method employed in an optical storage medium playback apparatus can be briefly summarized by following steps: reading a multimedia content from an optical storage medium; storing a portion of the multimedia content read from the optical storage medium into an external storage via a connection port of the optical storage medium playback apparatus when the external storage is electrically connected to the connection port; and accessing the portion of the multimedia content which is stored in the external storage electrically connected to the connection port and performing a playback operation upon data read from the optical storage medium, concurrently. Specifically, any optical storage medium playback apparatus using above steps when performing the playback operation upon data recorded on an optical storage medium falls within the scope of the present invention.

In above scenarios, the unused space in the external storage 20 is dynamically used for storing a portion of the multimedia content (e.g., an MP4 file, AVI file, or RM file) read from the optical storage medium 10 each time the external storage 20 is electrically connected to the connection port 104 of the optical storage medium playback apparatus 100. Preferably, before the external storage 20 is disconnected from the connection port 204, the aforementioned portion of the multimedia content stored into the unused space in the external storage 20 should be erased to release the occupied memory space.

With regard to a fifth operational scenario of the optical storage medium playback apparatus 100 shown in FIG. 1, the external storage 20 accessed by the optical storage medium playback apparatus 100 has a pre-defined space allocated therein for storing a database proposed by embodiments of the present invention. For example, the pre-defined space in the external storage 20 can be allocated through a specific application program running on a personal computer to which the external storage 20 is electrically connected. In an alternative implementation, the pre-defined space in the external storage 20 can also be allocated by the optical storage medium playback apparatus 100, if the optical storage medium playback apparatus 100 is configured to support the same function of the specific application program running on the personal computer. Briefly summarized, any means capable of securing a pre-defined space in the external storage 20 for storing a database can be employed. Further details of the fifth operational scenario are illustrated as follows.

Figure 6:
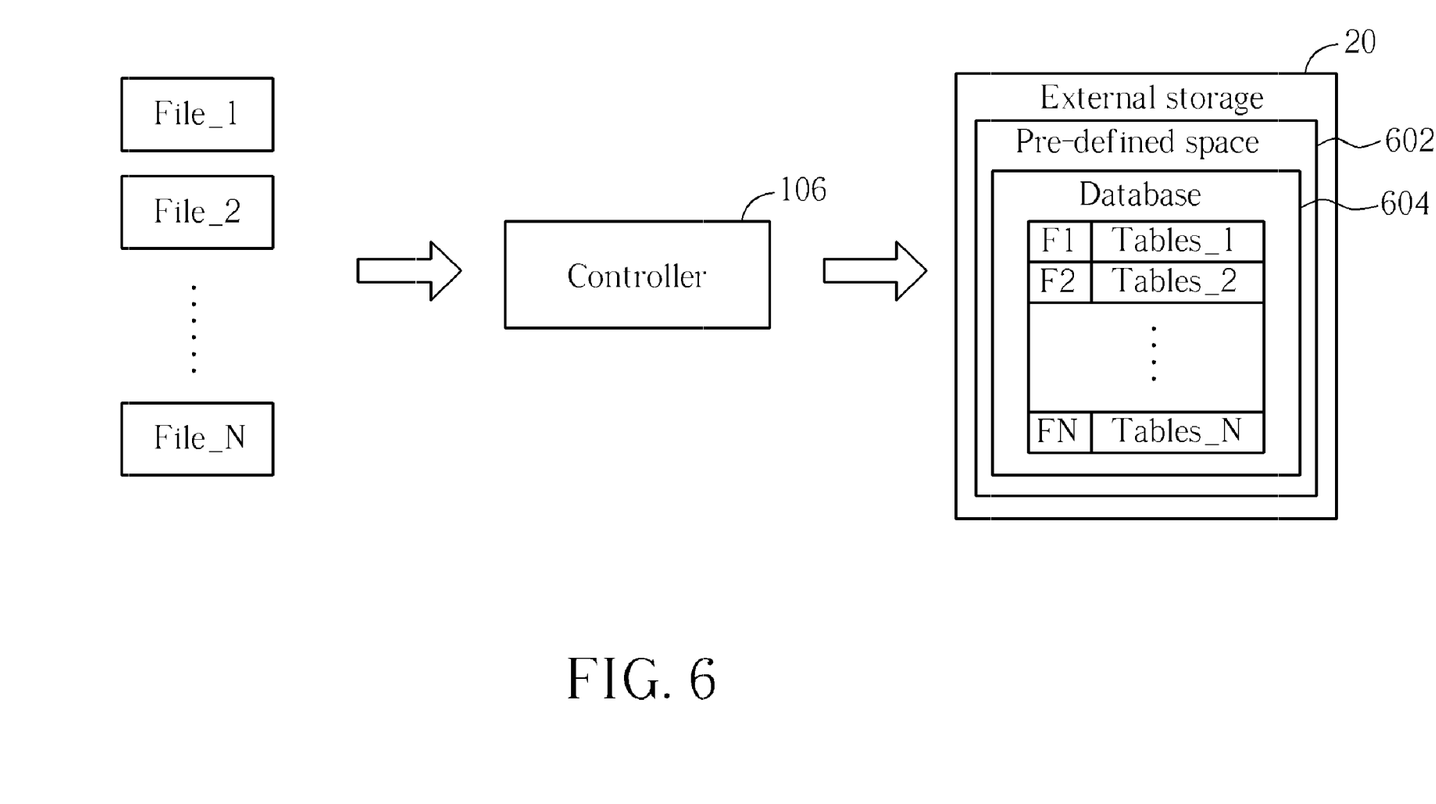
FIG. 6 is a schematic diagram illustrating a fifth operational scenario of the optical storage medium playback apparatus shown in FIG. 1.

Please refer to FIG. 6 in conjunction with FIG. 1. FIG. 6 is a schematic diagram illustrating a fifth operational scenario of the optical storage medium playback apparatus 100. As shown in FIG. 6, the external storage 20 has a pre-defined space 602 allocated for the database 604 whose contents are built according to the multimedia contents (i.e., files) which have been played by the optical storage medium playback apparatus 100. Specifically, when the first playback operation of each of the multimedia contents (e.g., files File_1, File_2, ..., File_N) read from one or more optical storage media has been performed by the controller 106, the controller 106 stores a portion of each multimedia content into the external storage 20 by adding the portion of the multimedia content into the database 604. In one exemplary implementation, the controller 106 first performs a hash function to convert each of the files File_1, File_2, ..., File_N into a hash value which serves as a database index F1, F2, ..., FN, and then stores tables Tables_1, Tables_2, ..., Tables_N included in the files File_1, File_2, ..., File_N, respectively, into the database 604. In other words, in this exemplary implementation, a portion of each multimedia content stored into the external storage 20 includes the aforementioned tables which define the file offsets (file positions) of audio/video data to be played under the normal-mode playback or trick-mode playback. Therefore, due to the database 604 built in the external storage 20 now, the optical storage medium playback apparatus 100 can skip preloading the tables for playing a specific multimedia content in the future after the first playback of the specific multimedia content is done. That is, in a case where the external storage 20 is electrically connected to the connection port 20 and the playback of the specific multimedia content on the optical storage medium 10 is initiated, the controller 106 refers to a hash value of the specific multimedia content to check if the database 604 in the external storage 20 includes tables corresponding to the specific multimedia content to be played, and accesses the requested tables from the external storage 20 instead of the optical storage medium 10 if the requested tables are found in the database 604. As the data access speed of the external storage 20 (e.g., a USB flash drive or hard drive) is faster than that of the optical storage medium 10 (e.g., an optical disc), the playback performance of the optical storage medium playback apparatus 100 is improved greatly.

Please note that in above-mentioned exemplary scenario shown in FIG. 6, the database 604 is defined to store tables include in the files which have been played at least once. However, the table is only one of the content-dependent information that should be referenced during the playback of the multimedia content. Therefore, the portion of the multimedia content added to the database 604 is not limited to tables which indicate file offsets (file positions) of the multimedia content's audio/video data.

Figure 7:
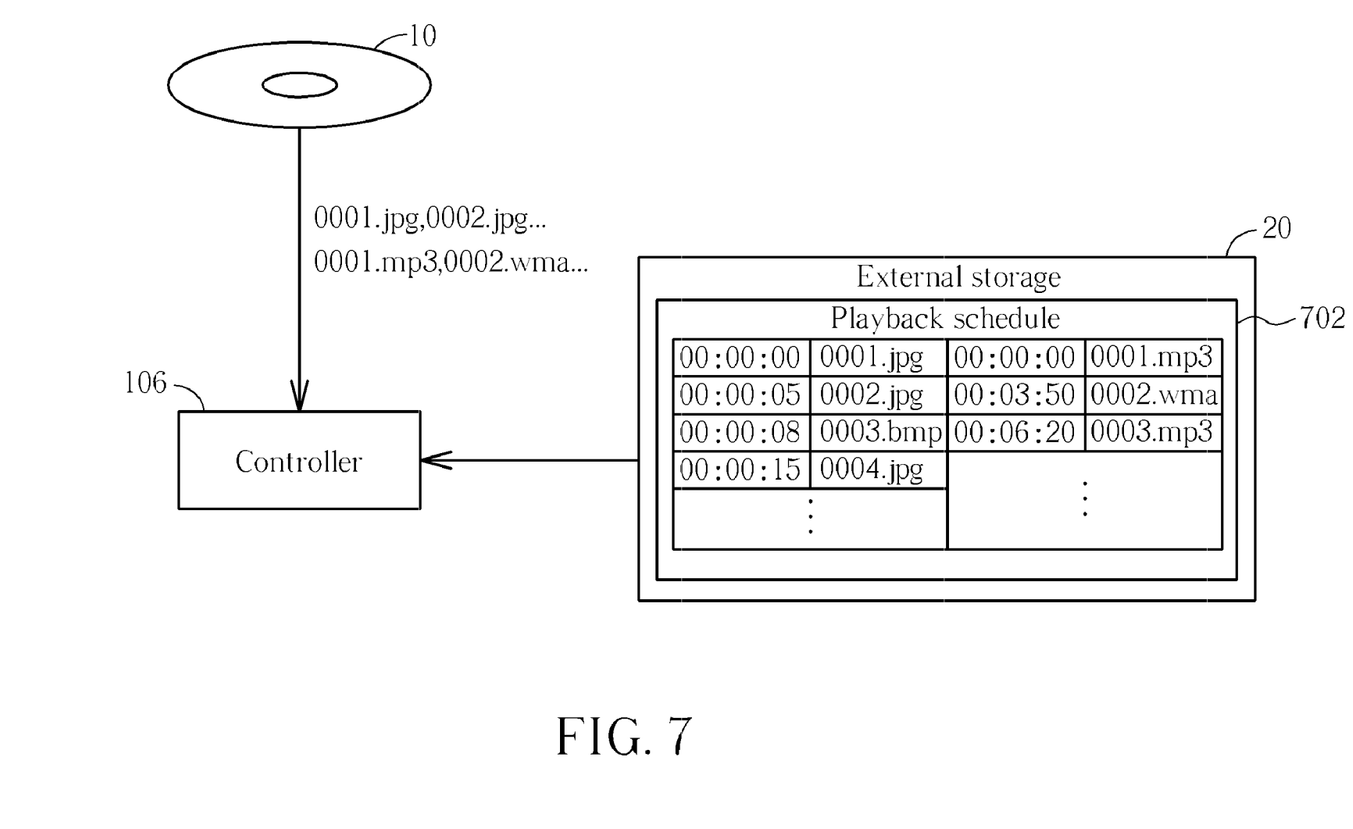
FIG. 7 is a schematic diagram illustrating a sixth operational scenario of the optical storage medium playback apparatus shown in FIG. 1.

Please refer to FIG. 7 in conjunction with FIG. 1. FIG. 7 is a schematic diagram illustrating a sixth operational scenario of the optical storage medium playback apparatus 100 shown in FIG. 1. As mentioned above, the conventional optical disc player has poor capability of creating/editing the playback schedule of audio/video files due to the inconvenient remote control and/or the small-sized internal memory. The optical storage medium playback apparatus 100 in the sixth operational scenario reads the playback schedule of audio/video files from the external storage 20, rather than creates/edits the playback schedule under the control of the user. Therefore, the user creates the desired playback schedule for multimedia contents, including video files and/or audio files stored on the optical storage medium 10, by any convenient means, and then stores the playback schedule 702 into the external storage 20. For example, the user can load the optical storage medium 10 which contains the multimedia contents stored thereon into an optical disc drive of a personal computer, and then edit the desired playback schedule 702 by a user interface provided by a specific application program running on the personal computer. After the playback schedule editing is done, the playback schedule 702 created by the personal computer is stored into the external storage 20 by any communication means between the external storage 20 and the personal computer. It should be noted that the contents of the playback schedule 702 shown in FIG. 7 are for illustrative purposes only, and are not meant to be limitations of the present invention. When the user loads the optical storage medium 10 which contains the multimedia contents listed on the playback schedule 702 into the optical storage medium playback apparatus 100 and connects the external storage 20 which stores the playback schedule 702 to the connection port 104, the controller 106 reads the playback schedule 702 from the external storage 20, processes the multimedia contents read from the optical storage medium 10 according to the playback schedule 702, and drives the output apparatus 30 to play the video contents (e.g., 0001.jpg, 0002.jpg, 0003.bmp, and 0004.jpg) at the user-specified presentation timings (e.g., 00:00:00, 00:00:05, 00:00:08, and 00:00:15) and/or the audio contents (e.g., 0001.mp3, 0002.wma, and 0003.mp3) at the user-specified presentation timings (e.g., 00:00:00, 00:03:50, and 00:06:20).

Briefly summarized, the exemplary optical storage medium playback apparatus (e.g., an optical disc player) is configured to output data read from an optical storage medium to an external storage (e.g., a USB device) not only for accelerating the initialization time of playing the multimedia contents (files), but also for performing trick-mode playback operations more accurately. Besides, the exemplary optical storage medium playback apparatus can also be configured to read a user-defined playback schedule of audio/video files recorded on an optical storage medium from an external storage, where the user-defined playback schedule stored in the external storage is prepared by the user using any convenient means other than the optical storage medium playback apparatus. In this way, the user-interface control convenience is improved by such a novel playback schedule editing and accessing scheme. Please note that MP4 file, AVI file, and RM file mentioned above are for illustrative purposes only. This by no means implies that the exemplary optical storage medium playback apparatus of the present invention can deal with these file formats only. After reading above description directed to the operational scenarios of the exemplary optical storage medium playback apparatus, a person skilled in the art can readily appreciate that the same conception of the present invention which uses an external storage for improving the overall playback performance and the user-interface control convenience can be applied to playback of other file formats.

Those skilled in the art will readily observe that numerous modifications and alterations of the device and method may be made while retaining the teachings of the invention.

What is claimed is:

1. An optical storage medium playback apparatus, comprising:
    an optical storage access device, for reading a multimedia content from an optical storage medium;
    a connection port, arranged for allowing an external storage of the optical storage medium playback apparatus to be removably coupled thereto; and
    a controller, coupled to the optical storage access device and the connection port, for storing a portion of the multimedia content read from the optical storage medium into the external storage via the connection port when the external storage is electrically connected to the connection port, and for accessing the portion of the multimedia content which is stored in the external storage electrically connected to the connection port and performing a playback operation upon data read from the optical storage medium concurrently.

2. The optical storage medium playback apparatus of claim 1, wherein the portion of the multimedia content read from the optical storage medium includes at least one table which define one or more file offsets of video or audio data to be processed by the playback operation.

3. The optical storage medium playback apparatus of claim 2, wherein the controller stores the portion of the multimedia content into the external storage by adding the at least one table to a database with a pre-defined space allocated in the external storage; and when the playback operation upon the optical storage medium is initiated, the controller further checks if the database in the external storage electrically connected to the connection port includes the at least one table corresponding to the multimedia content on the optical storage medium, and accesses the at least one table from the database if the at least one table is found in the database.

4. The optical storage medium playback apparatus of claim 1, wherein the controller stores the portion of the multimedia content into the external storage by adding the portion of the multimedia content to a database with a pre-defined space allocated in the external storage; and when the playback operation upon the optical storage medium is initiated, the controller further checks if the database in the external storage electrically connected to the connection port includes the portion of the multimedia content, and accesses the portion of the multimedia content from the database if the portion of the multimedia content is found in the database.

5. The optical storage medium playback apparatus of claim 1, wherein the portion of the multimedia content read from the optical storage medium includes data blocks which are contained in the multimedia content on the optical storage medium in an interleaved storage order different from an actual playback order of the data blocks.

6. The optical storage medium playback apparatus of claim 1, further comprising:
a buffer, coupled between the controller and the connection port, for buffering data requested by the playback operation from the portion of the multimedia content stored in the external storage electrically connected to the connection port.

7. The optical storage medium playback apparatus of claim 6, wherein the buffer is a first-in-first-out (FIFO) buffer, and the controller further controls the external storage electrically connected to the connection port to sequentially output requested data included in the portion of the multimedia content into the FIFO buffer.

8. The optical storage medium playback apparatus of claim 6, wherein the buffer is a first-in-first-out (FIFO) buffer, data included in the portion of the multimedia content stored in the external storage are stored in an interleaved storage order, and the controller further controls the external storage to output the data included in the portion of the multimedia content into the FIFO buffer in an actual playback order different from the interleaved storage order.

9. The optical storage medium playback apparatus of claim 1, further comprising:
a buffer, coupled between the optical storage access device and the connection port, for buffering data of the portion of the multimedia content to be stored into the external storage when the external storage is electrically connected to the connection port;
wherein the buffer does not write stored data into the external storage until a data amount of the stored data in the buffer reaches a predetermined value associated with writing characteristics of the external storage.

10. The optical storage medium playback apparatus of claim 9, wherein the external storage is a portable flash drive.

11. The optical storage medium playback apparatus of claim 1, wherein the connection port is a universal serial bus (USB) port.

12. An optical storage medium playback apparatus, comprising:
an optical storage access device, configured for reading a multimedia content from an optical storage medium;
a connection port, arranged for allowing an external storage of the optical storage medium playback apparatus to be removably coupled thereto; and
a controller, coupled to the optical storage access device and the connection port, for reading a playback schedule corresponding to the multimedia content on the optical storage medium from the external storage via the connection port when the external storage is electrically connected to the connection port, and performing a playback operation upon data read from the optical storage medium according to the playback schedule derived from the external storage.

13. The optical storage medium playback apparatus of claim 12, wherein the connection port is a universal serial bus (USB) port.

14. The optical storage medium playback apparatus of claim 12, being an optical disc player.

15. An optical storage medium playback method employed in an optical storage medium playback apparatus, comprising:
reading a multimedia content from an optical storage medium;
storing a portion of the multimedia content read from the optical storage medium into an external storage via a connection port of the optical storage medium playback apparatus when the external storage is electrically connected to the connection port, wherein the connection port is arranged for allowing the external storage of the optical storage medium playback apparatus to be removably coupled thereto; and
accessing the portion of the multimedia content which is stored in the external storage electrically connected to the connection port and performing a playback operation upon data read from the optical storage medium, concurrently.

16. The optical storage medium playback method of claim 15, wherein the portion of the multimedia content read from the optical storage medium includes at least one table which define one or more file offsets of video or audio data to be processed by the playback operation.

17. The optical storage medium playback method of claim 15, wherein the step of storing the portion of the multimedia content read from the optical storage medium into the external storage comprises adding the portion of the multimedia content to a database with a pre-defined space allocated in the external storage;
and the optical storage medium playback method further comprises:
when the playback operation upon the optical storage medium is initiated, checking if the database in the external storage electrically connected to the connection port includes the portion of the multimedia content, and accessing the portion of the multimedia content from the database if the portion of the multimedia content is found in the database.

18. The optical storage medium playback method of claim 15, wherein the portion of the multimedia content read from the optical storage medium includes data blocks which are contained in the multimedia content on the optical storage medium in an interleaved storage order different from an actual playback order of the data blocks.

19. The optical storage medium playback method of claim 15, further comprising:
utilizing a buffer for buffering data requested by the playback operation from the portion of the multimedia content stored in the external storage electrically connected to the connection port.

20. The optical storage medium playback method of claim 19, wherein the requested data included in the portion of the multimedia content is sequentially output to the buffer from the external storage electrically connected to the connection port.

21. The optical storage medium playback method of claim 19, wherein data included in the portion of the multimedia content stored in the external storage are stored in an interleaved storage order, and the buffer receives the data included in the portion of the multimedia content from the external storage according to an actual playback order different from the interleaved storage order.

22. The optical storage medium playback method of claim 15, further comprising:
utilizing a buffer for buffering data of the portion of the multimedia content to be stored into the external storage when the external storage is electrically connected to the connection port;
wherein the buffer does not write stored data into the external storage until a data amount of the stored data in the buffer reaches a predetermined value associated with writing characteristics of the external storage.

23. An optical storage medium playback apparatus, comprising:
an optical storage access device, for reading a multimedia content from an optical storage medium;
a connection port; and
a controller, coupled to the optical storage access device and the connection port, for storing a portion of the multimedia content read from the optical storage medium into an external storage via the connection port when the external storage is electrically connected to the connection port, and for accessing the portion of the multimedia content which is stored in the external storage electrically connected to the connection port and performing a playback operation upon data read from the optical storage medium concurrently;
wherein the controller stores the portion of the multimedia content into the external storage by adding the portion of the multimedia content to a database with a pre-defined space allocated in the external storage; and when the playback operation upon the optical storage medium is initiated, the controller further checks if the database in the external storage electrically connected to the connection port includes the portion of the multimedia content, and accesses the portion of the multimedia content from the database if the portion of the multimedia content is found in the database.

24. An optical storage medium playback apparatus, comprising:
an optical storage access device, for reading a multimedia content from an optical storage medium;
a connection port;
a controller, coupled to the optical storage access device and the connection port, for storing a portion of the multimedia content read from the optical storage medium into an external storage via the connection port when the external storage is electrically connected to the connection port, and for accessing the portion of the multimedia content which is stored in the external storage electrically connected to the connection port and performing a playback operation upon data read from the optical storage medium concurrently; and
a buffer, coupled between the controller and the connection port, for buffering data requested by the playback operation from the portion of the multimedia content stored in the external storage electrically connected to the connection port;
wherein the buffer is a first-in-first-out (FIFO) buffer, and the controller further controls the external storage electrically connected to the connection port to sequentially output requested data included in the portion of the multimedia content into the FIFO buffer.

25. An optical storage medium playback method employed in an optical storage medium playback apparatus, comprising:
reading a multimedia content from an optical storage medium;
storing a portion of the multimedia content read from the optical storage medium into an external storage via a connection port of the optical storage medium playback apparatus when the external storage is electrically connected to the connection port, comprising:
adding the portion of the multimedia content to a database with a pre-defined space allocated in the external storage;
accessing the portion of the multimedia content which is stored in the external storage electrically connected to the connection port and performing a playback operation upon data read from the optical storage medium, concurrently; and
when the playback operation upon the optical storage medium is initiated, checking if the database in the external storage electrically connected to the connection port includes the portion of the multimedia content, and accessing the portion of the multimedia content from the database if the portion of the multimedia content is found in the database.

26. An optical storage medium playback method employed in an optical storage medium playback apparatus, comprising:
reading a multimedia content from an optical storage medium;
storing a portion of the multimedia content read from the optical storage medium into an external storage via a connection port of the optical storage medium playback apparatus when the external storage is electrically connected to the connection port;
accessing the portion of the multimedia content which is stored in the external storage electrically connected to the connection port and performing a playback operation upon data read from the optical storage medium, concurrently; and
utilizing a buffer for buffering data requested by the playback operation from the portion of the multimedia content stored in the external storage electrically connected to the connection port;
wherein the requested data included in the portion of the multimedia content is sequentially output to the buffer from the external storage electrically connected to the connection port.

* * * * *